L. H. THOMAS.
Hold-Back.
No. 42,700. Patented May 10, 1864.
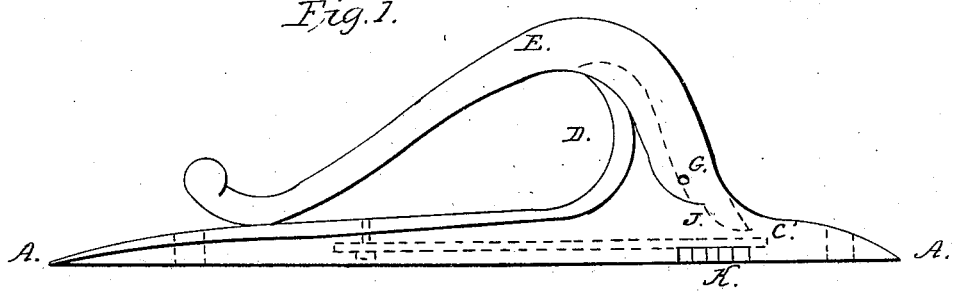
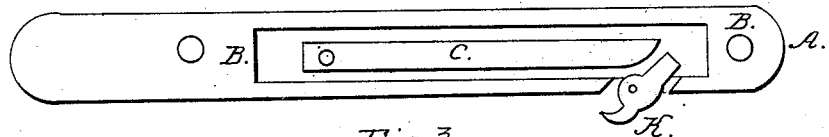
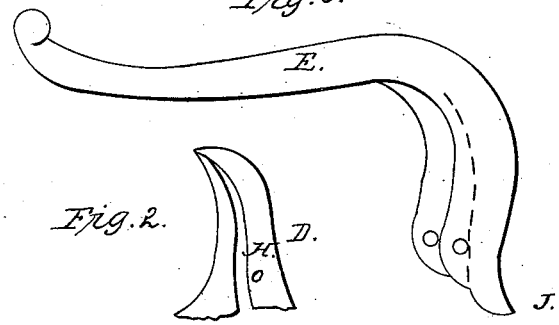
Witnesses:
J. Franklin Reigart
P. W. Thomas
Inventor:
L. H. Thomas

UNITED STATES PATENT OFFICE.

L. H. THOMAS, OF WATERBURY, VERMONT.

IMPROVEMENT IN CARRIAGES.

Specification forming part of Letters Patent No. 42,700, dated May 10, 1864.

*To all whom it may concern:*

Be it known that I, L. H. THOMAS, of Waterbury, county of Washington, and State of Vermont, have invented new and useful Improvements in Holdbacks for the Shafts of Carriages; and I do hereby declare the following to be an exact description of the construction and operation thereof, reference being had to the accompanying drawings, and to the letters of reference marked thereon, making a part of this specification.

The nature of my invention is a grooved hook, operating on a standard connected with a base or bed plate, in which is a flat horizontal adjustable spring that can be tightened or loosened whenever required, so that the hook is likewise locked or unlocked, for the double purpose of holding the harness strap permanently in the hook, or instantly adjusted, that the horse may free himself from the carriage, and thus suit the two kinds of harness now in use—one that holds the horse securely to the shafts, and the other that allows the horse to be instantly freed and detached the moment the traces are detached from the whiffletree—and has the advantage of giving greater safety and expedition in hitching and unhitching to a carriage.

Figure 1 represents a view of the holdback; Fig. 2, the flanged standard; Fig. 3, the grooved hook; Fig. 4, the under side of the bed-plate, showing the recess, spring, and dog.

A represents the base or bed plate, that is fastened by two screws to the shaft, the plate having a grooved recess, B, underneath, in which a flat spring, C, is fastened and operates. Upon the top of the bed-plate A is a curved and rounding standard, D, over which a grooved and curved hook, E, fits, and also operates upon a pivot, G. This standard D has flanges or shoulders H, against which the curved sides of the hook E rests. The hook E has a curved or shoe point, J, below, that rests and operates upon the end of the flat spring C, so that as the hook E is raised or opened in front for the purpose of inserting the breech strap the spring C forces the hook back again to its place, with its front resting upon the plate A, and the breech-strap is secured until the horse is freed from the whiffletree, when the strap slips forward and is disengaged without the time and trouble usually required to unbuckle the breech-strap.

K is a dog, operating on a center pin that is fastened to the plate A at the side, so that the one end projecting on the outside can be acted on as a short lever for moving the opposite end backward and forward underneath the end of spring C, for the purpose of tightening and stiffening the spring or loosening it, so as to lock or unlock the hook E. As the dog is pressed under the spring C, the spring is held firmly against the top of the recess B, and the hook is locked and prevented from being raised in front, so that the tug-strap is then permanently held in the hook, for the purpose of preventing the horse from being detached from the shafts, and securing him to the shafts, as that kind of harness requires—that is, when the shafts are attached to the tug-strap of the saddle, instead of the breech-strap of the harness—thus having the double advantage of adapting itself to both kinds of harness.

I claim—

The arrangement, construction, and combination of the grooved hook E, flanged standard D, adjustable spring C, and dog K, when arranged, constructed, and combined as herein described, for the purposes set forth.

L. H. THOMAS.

Witnesses:
JOHN HOLLINGSHEAD,
J. FRANKLIN REIGART.